P. E. FRITZ.
SHIM.
APPLICATION FILED MAR. 24, 1921.
1,391,886.
Patented Sept. 27, 1921.
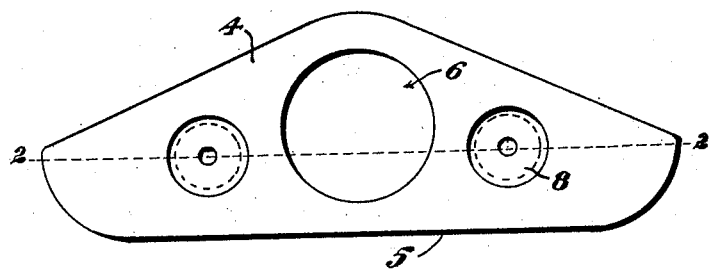
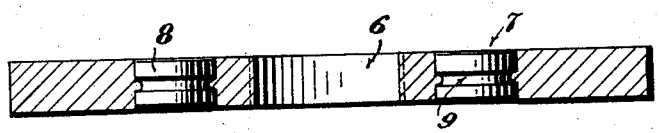
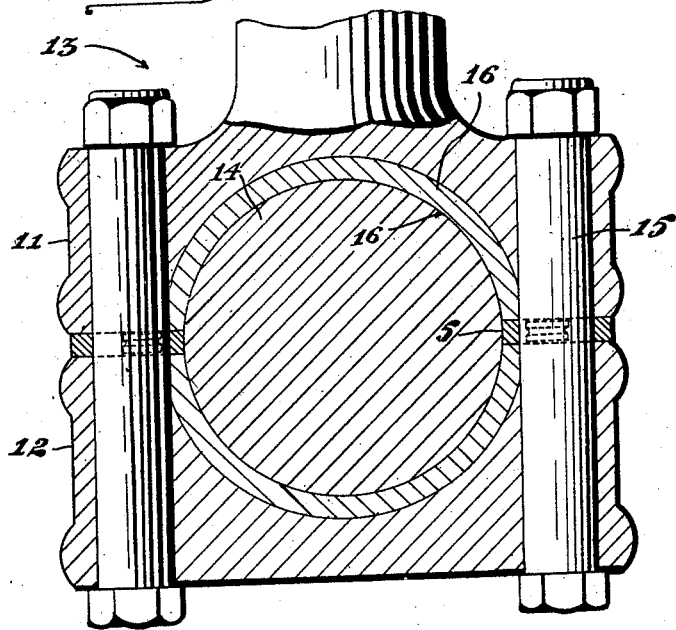
Inventor
Perry E. Fritz.
By N. W. Crandall
Attorney

UNITED STATES PATENT OFFICE.

PERRY E. FRITZ, OF LOS ANGELES, CALIFORNIA.

SHIM.

1,391,886.  Specification of Letters Patent.  Patented Sept. 27, 1921.

Application filed March 24, 1921. Serial No. 455,112.

*To all whom it may concern:*

Be it known that I, PERRY E. FRITZ, a citizen of the United States, residing at Los Angeles, in the county of Los Angeles and State of California, have invented new and useful Improvements in Shims, of which the following is a specification.

This invention relates to shims and particularly pertains to a shim to be employed between upper and lower halves of connecting rod boxes in internal combustion engines, compressors and the like.

An object of my invention is to provide a shim of the above type adapted to conform to irregularities in the opposed faces of halves of connecting rod boxes to completely fill all spaces therebetween to facilitate retention of lubricating oil as well as to insure accurate fitting of the boxes upon a crank pin.

Another object of the invention is to provide a shim in which that edge which is adjacent the crank pin and parallel thereto, bears directly upon the crank pin and presents a smooth frictionless bearing surface of bearing metal.

A further object of the invention is to provide a construction in shims, with the above objects in view, whereby soft bearing metal may be employed to form a shim of the requisite characteristics and adapted to resist excessive compression so that it will not be squeezed from between abutting surfaces.

The invention is illustrated by the accompanying drawings, in which:

Figure 1 is a view in perspective of a shim constructed in accordance with the invention.

Fig. 2 is a view in section as seen on the line 2—2 Fig. 1, looking in the direction of the arrows.

Fig. 3 is a view in vertical section of a connecting box and crank pin showing the shim applied thereto.

Fig. 4 is a view in vertical section of an inserted part of the shim.

More specifically, in carrying out my invention I employ a blank 4, of soft metal or babbitt such as is employed on bearing surfaces. The blank may be formed by stamping from thin stock or by casting, and preferably by the latter method. The blank is shaped to conform to the general outline of the faces of the halves of the connecting rod box or other surfaces to which it is to be applied and is here shown as of the common triangular form with rounded corners and of sufficient thickness to provide a bearing face 5 on its forward edge.

In forming the blank a centrally located hole 6 is provided, and a plurality of other holes 7 of smaller diameter are also provided, preferably two in number with one disposed at each side of the larger hole, spaced a short distance therefrom and disposed below the center line of the larger hole. The smaller holes are provided for the purpose of receiving stops 8, of suitable form and material but here shown as being cylindrical in form, and which are of a harder material than the blank, such as brass or bronze. The stops are pressed into the holes 7, and to insure of their holding securely therein they are provided with an annular groove 9. The upper and lower ends of these stops are rounded slightly to facilitate insertion in the holes and to remove burs. The annular grooves provide sharp edges 10, tending to hold the stops in the blank, and the grooves also permit of the soft metal of the blank expanding therein when the shim is subject to pressure. The stops are of such length relative to the thickness of the blank that both the upper and lower ends are disposed below the surface of the blank so that the shim may be compressed slightly before the surfaces are brought flush with the stops.

These stops definitely predetermine the degree to which the shim may be compressed and permit of the shim being subject to high compression without possibility of being compressed beyond the limit set by the stops.

Two of the shims described are shown in Fig. 3 in position between the upper and lower halves 11 and 12 respectively of a connecting rod box 13 which is shown as encompassing a crank pin 14 in the manner common to reciprocating engines and the like. These halves are held together by bolts 15, which pass through the hole 6, of the shim. Each half of the box is lined with bearing metal 16 to provide a bearing surface 16', for the crank pin. The hole 6, is so positioned relative to the face 5, of the shim that when the shim is in place the face protrudes beyond the bearing surface of the boxes. When a new pair of shims are being fitted to a connecting rod, the protruding ends of the shims are faced off by a reamer of the diameter of the crank pin so that the face of each shim is made slightly concave to conform to the curvature of the bearing surface 16' and the bearing metal 16 on the box together with the face 5 of each shim jointly provide a continuous bearing surface completely surrounding the crank pin. The bolts may subsequently be tightened as the crank pin wears in on the bearing surface. The surfaces of the stops are now practically in contact with the adjacent surfaces of the halves of the box and will serve to prevent further appreciable compression of the shim by excessive pressures. Owing to the ductile qualities of the shims, vibration and contraction and expansion of the connecting rod box will not materially affect the shims.

While I have shown and described a specific embodiment of my invention I am not limited to the exact details of construction shown and described but may employ other constructions without departing from the spirit of the invention, coming within the scope of the appended claims, and while I have shown and described an application of the invention to shims for connecting rods the invention may be applied to shims for various purposes as well as to thrust-washers, gaskets, thrust-bearings and the like, where soft metal is required or is advantageous.

I claim:

1. A shim comprising a soft metal blank and a plurality of stops of harder metal embedded in said blank, adapted to prevent compression of the blank beyond a predetermined degree.

2. A shim comprising a blank and stops embedded in said blank, said stops formed of harder material than said blank, whereby the blank is prevented from being compressed beyond a predetermined degree.

3. A shim comprising a soft metal blank and a plurality of metal stops extending vertically through said blank and having their upper and lower surfaces disposed below the corresponding surfaces of the blank.

4. A shim comprising a blank of soft metal, and a plurality of stops extending vertically through the blank, said stops formed of harder metal than said blank and provided with annular grooves.

5. In combination with a connecting rod box comprising two half sections lined interiorly with bearing metal; shims formed of bearing metal disposed between said half sections to form jointly with said bearing metal a continuous annular bearing surface and stops in said shims of metal harder than the metal of the shims to prevent compression thereof beyond a predetermined degree.

PERRY E. FRITZ.